United States Patent
Taguri et al.

(10) Patent No.: US 11,945,252 B2
(45) Date of Patent: Apr. 2, 2024

(54) RECORDING MEDIUM AND INK JET RECORDING METHOD

(71) Applicant: CANON KABUSHIKI KAISHA, Tokyo (JP)

(72) Inventors: Ryo Taguri, Kanagawa (JP); Shinya Yumoto, Tokyo (JP); Arika Tanaka, Kanagawa (JP); Toshihiro Omagari, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 158 days.

(21) Appl. No.: 17/734,954

(22) Filed: May 2, 2022

(65) Prior Publication Data

US 2022/0355604 A1 Nov. 10, 2022

(30) Foreign Application Priority Data

May 7, 2021 (JP) .................................. 2021-079108
Apr. 6, 2022 (JP) .................................. 2022-063422

(51) Int. Cl.
*B41M 5/50* (2006.01)
*B41M 5/00* (2006.01)
*C08L 23/06* (2006.01)

(52) U.S. Cl.
CPC .......... *B41M 5/502* (2013.01); *B41M 5/0023* (2013.01); *C08L 23/06* (2013.01); *C08L 2205/025* (2013.01); *C08L 2207/062* (2013.01); *C08L 2207/066* (2013.01)

(58) Field of Classification Search
CPC .... B41M 5/502; B41M 5/0023; B41M 5/506; B41M 5/5218; C08L 23/06; C08L 2205/025; C08L 2207/062; C08L 2207/066
See application file for complete search history.

(56) References Cited

U.S. PATENT DOCUMENTS

2012/0194625 A1* 8/2012 Niu ...................... B41M 5/5218
347/106

FOREIGN PATENT DOCUMENTS

| JP | H07232473 A | 9/1995 |
|----|-------------|--------|
| JP | H08132731 A | 5/1996 |
| JP | H0966664 A | 3/1997 |
| JP | H0976628 A | 3/1997 |
| JP | 2012200891 A | 10/2012 |

* cited by examiner

*Primary Examiner* — Bradley W Thies
(74) *Attorney, Agent, or Firm* — CANON U.S.A., INC. IP Division

(57) ABSTRACT

A recording medium includes a substrate, a first ink-receiving layer, and a second ink-receiving layer adjacent to the first ink-receiving layer, in this order. The first ink-receiving layer has a positive surface zeta potential, and the second ink-receiving layer has a negative surface zeta potential. The thickness of the second ink-receiving layer is 2 μm to 15 μm.

10 Claims, No Drawings

RECORDING MEDIUM AND INK JET RECORDING METHOD

BACKGROUND OF THE INVENTION

Field of the Invention

The present disclosure relates to a recording medium and an ink jet recording method.

Description of the Related Art

Glossy recording media used for ink jet recording methods typically include an ink-receiving layer formed by binding inorganic particles, such as silica particles or hydrated alumina particles, with polyvinyl alcohol or other binder. Japanese Patent Laid-Open No. 2012-200891 discloses a highly glossy recording medium including an anionic colloidal silica layer over a fumed silica layer.

Aqueous ink jet inks are roughly classified into aqueous dye inks in which coloring material is dissolved in water and aqueous pigment inks in which coloring material is dispersed in water. Pigment inks are superior to dye inks in terms of resistance to image discoloration. Accordingly, recorded articles (printed articles), which are produced by applying ink onto recording media, to be stored for a long period or used as displays exposed to light may be recorded articles prepared with pigment ink.

SUMMARY OF THE INVENTION

The present disclosure provides a highly glossy recording medium that can reduce beading in image recording at a high speed using pigment ink and produce highly color-developed images in image recording using dye ink. The present disclosure also provides an ink jet recording method that can record high-quality images.

The present disclosure is implemented as follows.

According to an aspect of the present disclosure, a recording medium is provided. The recording medium includes a substrate, a first ink-receiving layer, and a second ink-receiving layer adjacent to the first ink-receiving layer, in this order. The first ink-receiving layer contains first inorganic particles having an average primary particle size of 50 nm or less. The first inorganic particles are particles of at least one material selected from the group consisting of fumed silica, fumed alumina, and hydrated alumina. The first ink-receiving layer has a positive surface zeta potential. The second ink-receiving layer contains second inorganic particles having an average primary particle size of 50 nm or less. The second inorganic particles are particles of at least one material selected from the group consisting of fumed silica, fumed alumina, and hydrated alumina. The second ink-receiving layer has a negative surface zeta potential. The second ink-receiving layer has a thickness of 2 μm to 15 μm.

According to another aspect of the present disclosure, an ink jet recording method is provided. The method includes recording an image on the recording medium by applying at least one of pigment ink containing pigment and dye ink containing dye from an ink jet recording head onto the surface of the recording medium on the side having the first ink-receiving layer and the second ink-receiving layer.

Further features of the present disclosure will become apparent from the following description of exemplary embodiments.

DESCRIPTION OF THE EMBODIMENTS

According to research conducted by the present inventors, the recording medium disclosed in Japanese Patent Laid-Open No. 2012-200891 is highly glossy but does not allow satisfactory images to be recorded when recorded with pigment inks at high speed because the recorded image has grainy nonuniformity (hereinafter also referred to as beading). The present inventors have conducted intensive research on highly glossy recording media that can reduce beading in image recording at a high speed using pigment ink and can produce highly color-developed images in image recording using dye ink, reaching the disclosure.

The present disclosure will be described with reference to the following exemplary embodiments.

To reduce beading caused when glossy recording media are subjected to recording with pigment ink at high speed, in the related art, the ink has been applied little by little at a reduced printing speed of the printer (image recording apparatus). Accordingly, the printing speed with pigment ink is notably lower than that with dye inks.

Glossy paper (glossy recording media) used as ink jet photo paper has a finely porous ink-receiving layer on a substrate. The ink-receiving layer is formed by applying a coating liquid containing inorganic fine particles and drying the coating liquid. Unlike the coloring material of dye ink, the coloring material of pigment ink is not dissolved but dispersed in the ink. Pigment inks may contain a water-soluble anionic resin to stabilize the dispersion of the pigment that is a coloring material and enhance the strength of the pigment-containing coating film that forms the image on the recording medium after image recording.

A typical home-use ink jet printer forms images by ejecting tiny droplets of ink onto a recording medium while scanning the recording medium multiple times. Research conducted by the present inventors has revealed that when pigment ink is ejected while the recording medium is scanned multiple times, the absorption rate of the pigment ink into the recording medium is reduced in the second and subsequent scans, causing beading. Further research conducted by the present inventors has identified the cause of the reduced absorption rate of pigment ink into the ink-receiving layer. Specifically, the water-soluble resin in the pigment ink applied onto the recording medium by the first scan clogs the pores in the surface of the ink-receiving layer, thereby reducing the absorption rate. In general, the ink-receiving layer of the recording medium used as photo paper contains cationic components, such as cationic inorganic particles or cationic resin to fix the anionic dye in ink to the medium. When pigment ink is applied onto a recording medium, the water-soluble anionic resin in the ink reacts ionically with the cationic component in the ink-receiving layer to fix to the surface of the recording medium, thus clogging the pores of the surface.

In an approach to reducing the clogging of the water-soluble resin, the pore size of the ink-receiving layer can be sufficiently increased. For this purpose, large inorganic particles are added into the ink-receiving layer, unfortunately increasing the surface roughness of the ink-receiving layer. Such a recording medium is not likely to have a high gloss.

Thus, the present inventors have found that even for glossy recording media, the zeta potential at the surface of the second ink-receiving layer should be controlled to be negative to reduce beading. This approach enables the second ink-receiving layer to be inhibited from adsorbing the water-soluble anionic resin in the pigment ink by the repulsion of the electric charges and thus reduces the likelihood that the water-soluble resin clogs the pores of the second ink-receiving layer. In addition, the second ink-receiving layer contains second inorganic particles having an average primary particle size of 50 nm or less, reducing the pore size of the second ink-receiving layer. Consequently, when pigment ink is used, the pigment is not likely to pass through the pores of the second ink-receiving layer and can be retained on the surface of the second ink-receiving layer, thus improving the color development of the image.

Unlike the pigment, the dye in dye ink cannot be physically retained on the surface of the second ink-receiving layer even though the pore size of the second ink-receiving layer is small. Therefore, the dye easily passes through the second ink-receiving layer. However, the positive zeta potential of the first ink-receiving layer adjacently disposed under the second ink-receiving layer attracts the charges of the dye to retain the dye at the top of the first ink-receiving layer. The thickness of the second ink-receiving layer is relatively as small as 2 µm to 15 µm. Accordingly, a degradation in color development due to the second ink-receiving layer can be reduced, thus improving the color development of images recorded using dye ink.

The present disclosure will be further described in detail with reference to exemplary embodiments.

Recording Medium

The recording medium disclosed herein includes a substrate and ink-receiving layers. The ink-receiving layers include at least two layers: a first ink-receiving layer, and a second ink-receiving layer adjacent to the first ink-receiving layer. The second ink-receiving layer is the outermost layer. Another layer may be provided between the first ink-receiving layer and the substrate, provided that the effectiveness of the disclosure can be ensured. The recording medium may be an ink jet recording medium used for ink jet recording. The component members of the recording medium will be described below.

Substrate

The substrate may be composed of only a base sheet or may include a base sheet and a resin layer coating the base sheet. In particular, substrates including a base sheet and a resin layer may be used. In such a substrate, the resin layer may be provided on one side of the base sheet, or may be provided on both sides from the viewpoint of reducing curling of the recording medium.

Base Sheet

The base sheet is mainly made of wood pulp and may optionally contain synthetic pulp, such as polypropylene, or synthetic fiber, such as nylon or polyester. Examples of wood pulp include leaf bleached kraft pulp (LBKP), leaf bleached sulfite pulp (LBSP), needle bleached kraft pulp (NBKP), needle bleached sulfide pulp (NBSP), leaf dissolving pulp (LDP), needle dissolving pulp (NDP), leaf unbleached kraft pulp (LUKP), and needle unbleached kraft pulp (NUKP). These pulps may be used individually or in combination as needed. Of these wood pulps, LBKP, NBSP, LBSP, NDP, and LDP may be used. Such wood pulp contains short fibers in a large proportion. Chemical pulp with few impurities, such as sulfate pulp or sulfite pulp, may be used. Pulp bleached to increase the whiteness may also be used. The base sheet may further contain a sizing agent, a white pigment, a reinforcing agent, a fluorescent brightening agent, a moisturizing agent, a dispersant, a softening agent, and other additives as appropriate.

The thickness of the base sheet is preferably 50 µm to 200 µm, more preferably 90 µm to 180 µm. The thickness of the base sheet mentioned herein is determined as described below. First, the recording medium is cut to expose a section with a microtome, and the section is observed by scanning electron microscopy. The thickness of the base sheet is measured at 100 or more randomly selected points, and the average of the measurements is defined as the thickness of the base sheet. The thicknesses of layers other than the base sheet are also determined in the same manner.

The density of the base sheet specified in HS P 8118 is preferably 0.6 g/cm$^3$ to 1.2 g/cm$^3$, more preferably 0.7 g/cm$^3$ to 1.2 g/cm$^3$.

Resin Layer

If the base sheet is coated with a resin, a resin layer may cover a portion of the surface of the base sheet. In this instance, the coverage of the resin layer (represented by (area of the base sheet surface covered with the resin layer)/(area of the entire base sheet surface)) is preferably 70% or more, more preferably 90% or more, particularly preferably 100%. When the coverage of the resin layer is 100%, the entire surface of the base sheet is covered with the resin layer.

The thickness of the resin layer is preferably 10 µm to 60 µm, more preferably 15 µm to 50 µm. If the resin layer is provided on both sides of the base sheet, each resin layer may have a thickness in such a range.

The resin layer can be made of a thermoplastic resin. Examples of the thermoplastic resin include acrylic resin, acrylic silicone resin, polyolefin resin, and styrene-butadiene copolymers. Of these, polyolefin resin may be used. Polyolefin resin refers to a polymer using an olefin as a monomer. For example, the polyolefin resin used herein may be a homopolymer or copolymer of one or more monomers such as ethylene, propylene, and isobutylene. The polyolefin resin may be a single polyolefin or a combination of two or more polyolefins as needed. Of these, polyethylene may be used. The polyethylene may be a low-density polyethylene (LDPE) or a high-density polyethylene (HDPE).

The resin layer may contain a white pigment, a fluorescent brightening agent, ultramarine blue, or the like to adjust opacity, whiteness, or hue. In particular, the resin layer may contain a white pigment to increase opacity. The white pigment may be titanium oxide in the rutile or anatase form. The content of the white pigment in the resin layer may be 3 g/m$^2$ to 30 g/m$^2$. When the resin layer is provided on both sides of the base sheet, the total content of the white pigment in the two resin layers can be in this range. Also, the content of the white pigment in the resin layer may be 25% by mass or less relative to the resin content. If the content of the white pigment exceeds 25% by mass, the dispersion stability of the white pigment may be insufficient.

Ink-Receiving Layers

The ink-receiving layers may be provided on either side or both sides of the substrate. The total thickness of the ink-receiving layers on one side of the substrate is preferably 25 µm to 60 µm, more preferably 30 µm to 50 µm. In the following description, the first ink-receiving layer may be referred to as the lower layer, and the second ink-receiving layer may be referred to as the upper layer. The constituents that can be contained in each ink-receiving layer will now be described.

First Ink-Receiving Layer (Lower Layer)

Inorganic Particles

The first ink-receiving layer contains inorganic particles (hereinafter also referred to as first inorganic particles). From the viewpoint of giving the first ink-receiving layer a positive surface zeta potential, cationic inorganic particles may be used as the first inorganic particles. Alternatively, if inorganic particles that are not cationic are used, a cationic surface treatment agent or the like may be used to control the surface charge of the inorganic particles to be positive. The use of cationic inorganic particles can increase the fixability of the anionic dye in dye ink to the first ink-receiving layer, thus improving the color development of the dye ink.

The first inorganic particles have an average primary particle size of 50 nm or less. Using such particles reduces the pore size of the first ink-receiving layer to increase the fixability of the dye to the first ink-receiving layer. The average primary particle size of the first inorganic particles is preferably 5 nm to 50 nm, more preferably 5 nm to 40 nm, particularly preferably 5 nm to 30 nm.

The average primary particle size of inorganic particles mentioned herein is determined by observing a section of the recording medium with a scanning electron microscope (SEM), measuring the diameters of 100 randomly selected particles, and calculating the number average.

The first inorganic particles may be dispersed with a dispersant in a coating liquid that will be used to form the first ink-receiving layer. The average secondary particle size of the first inorganic particles in such a dispersion is preferably 1 nm to 1000 nm, more preferably 10 nm to 800 nm, particularly preferably 50 nm to 500 nm. The average secondary particle size of the inorganic particles dispersed in the coating liquid for the ink-receiving layer can be measured by dynamic light scattering.

The content of the first inorganic particles in the first ink-receiving layer may be 80% by mass or more relative to the total mass of the first ink-receiving layer. The content of the first inorganic particles in the first ink-receiving layer may be 80% by mass to 95% by mass relative to the total mass of the first ink-receiving layer.

The thickness of the first ink-receiving layer may be 15 μm to 45 μm.

The material of the first inorganic particles is at least one selected from the group consisting of fumed silica, fumed alumina, and hydrated alumina. The use of such inorganic particles can increase ink absorbency. The first ink-receiving layer may contain other inorganic particles apart from the first inorganic particles. Examples of materials of such inorganic particles include titanium dioxide, zeolite, kaolin, talc, hydrotalcite, zinc oxide, zinc hydroxide, aluminum silicate, calcium silicate, magnesium silicate, zirconium oxide, and zirconium hydroxide. These inorganic particles may be used individually or in combination as needed.
Fumed Silica Depending on the production process, silica is roughly classified into two types: wet process silica and dry process silica (fumed silica). In a known wet process, hydrous silica is produced by decomposing a silicate into active silica with an acid and polymerizing the active silica to an appropriate extent to aggregate and settle the silica. In a known dry process (gas-phase process), anhydrous silica is produced by high-temperature gas phase hydrolysis (flame hydrolysis) of a silicon halide or by an arc method of heating silica sand and coke by arc in an electrical furnace for reduction vaporization and oxidizing the vapor with air. As silica, silica obtained by a dry process (gas-phase process) (hereinafter also referred to as fumed silica) may be used. Fumed silica has a notably large specific area and accordingly has high ink absorbency. Also, fumed silica has a low refractive index and accordingly can impart transparency to the ink-receiving layer, consequently forming highly color-developed images. Examples of fumed silica include AEROSIL (produced by Nippon Aerosil) and Reolosil QS series (produced by Tokuyama).

The specific surface area of fumed silica determined by the Brunauer-Emmett-Teller (BET) method is preferably 50 m$^2$/g to 400 m$^2$/g, more preferably 200 m$^2$/g to 300 m$^2$/g. The average primary particle size of fumed silica is preferably 5 nm to 50 nm, more preferably 5 nm to 40 nm, particularly preferably 5 nm to 30 nm.

The fumed silica used in the first ink-receiving layer may be dispersed with a dispersant in the coating liquid for forming the first ink-receiving layer. The average secondary particle size of the fumed silica dispersed in the coating liquid is preferably 50 nm to 300 nm, more preferably 100 nm to 250 nm.
Fumed Alumina Example of fumed alumina include AEROXIDE series Alu C, Alu 130, and Alu 65 (all produced by EVONIK).

The specific surface area of fumed alumina determined by the BET method is preferably 50 m$^2$/g to 150 m$^2$/g, more preferably 80 m$^2$/g to 120 m$^2$/g.

The average primary particle size of fumed alumina is preferably 5 nm to 30 nm, more preferably 11 nm to 15 nm.
Hydrated Alumina In the first ink-receiving layer, hydrated alumina represented by the following general formula (X) may be used:

$$Al_2O_{3-n}(OH)_{2n} \cdot mH_2O \qquad (X)$$

wherein n represents 0, 1, 2, or 3, m represents a number of 0 to 10, for example, 0 to 5, and m and n are not simultaneously 0.

$mH_2O$ represents a desorbable aqueous phase not involved in forming crystal lattices, and m is therefore not necessarily an integer. Also, m can decrease to 0 when the hydrated alumina is heated.

The hydrated alumina can be produced in a known process. For example, aluminum alkoxide or sodium aluminate may be hydrolyzed, or a sodium aluminate aqueous solution may be neutralized by adding an aqueous solution of aluminum sulfate or aluminum chloride.

Hydrated alumina may be amorphous or have a crystal structure in the form of gibbsite or boehmite, depending on heat treatment temperature. The crystal structure of hydrated alumina can be analyzed by X-ray diffraction. Of these, the hydrated alumina may be amorphous or in the form of boehmite. For example, hydrated alumina used in Japanese Patent Laid-Open Nos. 7-232473, 8-132731, 9-66664, or 9-76628 may be used. Also, the hydrated alumina is commercially available as, for example, Disperal series HP 14 and HP 18 (both produced by Sasol). These types of hydrated alumina may be used individually or in combination as needed.

The specific surface area of hydrated alumina determined by the BET method is preferably 100 m$^2$/g to 200 m$^2$/g, more preferably 125 m$^2$/g to 175 m$^2$/g. The BET method is a technique for measuring specific surface area. In this method, molecules or ions having a known size are adsorbed to the sample surface, and the specific surface area of the sample is calculated from the amount of adsorbed molecules or ions. The gas to be adsorbed to the sample is nitrogen.

Fumed silica, fumed alumina, and hydrated alumina may be mixed. For example, at least two selected from fumed silica, fumed alumina, and hydrated alumina may be mixed in powder form and then dispersed in a liquid to prepare a dispersion liquid, or dispersion liquids prepared by separately dispersing the individual types of inorganic particles may be mixed. Although either process may be used in the present disclosure, dispersion liquids prepared by separately dispersing the individual types of inorganic particles may be mixed.

The second ink-receiving layer may contain colloidal silica. However, it should be noted that if colloidal silica is distributed with high density at the surface of the second ink-receiving layer, the ink absorbency of the recording medium can be reduced. The content of the colloidal silica in the second ink-receiving layer is preferably 0% by mass to 50% by mass, more preferably 0% by mass to 40% by mass, even more preferably 0% by mass, relative to the total mass of the second ink-receiving layer.

Binder

The first ink-receiving layer may contain a binder (hereinafter also referred to as the first binder). The term binder used herein refers to a material that can bind inorganic particles to form an ink-receiving layer.

In view of ink absorbency, the content of the first binder in the first ink-receiving layer is preferably 50% by mass or less, more preferably 30% by mass or less, relative to the content of the first inorganic particles. Also, in view of the binding property of the first ink-receiving layer, the content of the first binder in the first ink-receiving layer is preferably 5.0% by mass or more, more preferably 8.0% by mass or more, relative to the content of the first inorganic particles.

Examples of the binder include starch derivatives, such as oxidized starch, etherified starch, and phosphorylated starch; cellulose derivatives, such as carboxymethyl cellulose and hydroxyethyl cellulose; casein, gelatin, soy protein, polyvinyl alcohol, and their derivatives; conjugated polymer latexes, such as polyvinylpyrrolidone, maleic anhydride resin, styrene-butadiene copolymer, and methyl methacrylate-butadiene copolymer; acrylic polymer latexes, such as polymers of acrylic esters and methacrylic esters; vinyl polymer latexes, such as ethylene-vinyl acetate copolymer; functional group-modified polymer latexes made of monomers of the above-cited polymers having carboxy or other functional groups; water-soluble binders, such as melamine resin, urea resin, and other thermosetting synthetic resins; polymers and copolymers of methacrylic esters and acrylic esters, such as polymethyl methacrylate; and other synthetic resins such as polyurethane resin, unsaturated polyester resin, vinyl chloride-vinyl acetate copolymer, polyvinyl butyral, and alkyd resin. Such binders may be used individually or in combination as needed.

In particular, polyvinyl alcohol or a polyvinyl alcohol derivative may be used as the binder. Examples of the polyvinyl alcohol derivative include anion-modified polyvinyl alcohols, silanol-modified polyvinyl alcohols, and polyvinyl acetal. Polyvinyl alcohol can be synthesized by, for example, saponifying polyvinyl acetate. The saponification degree of the polyvinyl alcohol is preferably 80% by mole to 100% by mole, more preferably 85% by mole to 98% by mole. A saponification degree represents the proportion of the number of moles of the hydroxy group formed by saponification when polyvinyl alcohol is produced by saponifying polyvinyl acetate. In the present disclosure, a saponification degree refers to a value measured by the method specified in JIS K 6726. The polyvinyl alcohol preferably has an average polymerization degree of 2,000 or more, more preferably 2,000 to 5,000. The term average polymerization degree mentioned herein is the viscosity average polymerization degree measured by the method specified in JIS K 6726.

For preparing a coating liquid for forming the first ink-receiving layer, an aqueous solution of polyvinyl alcohol or a polyvinyl alcohol derivative may be used. In this instance, the polyvinyl alcohol or polyvinyl alcohol derivative solid content of the aqueous solution may be 3% by mass to 20% by mass.

Crosslinking Agent

The first ink-receiving layer may further contain a crosslinking agent. Examples of the crosslinking agent include aldehyde compounds, melamine compounds, isocyanate compounds, zirconium-based compounds, amide-based compounds, aluminum-based compounds, boric acid, and borates. Such crosslinking agents may be used individually or in combination as needed. In particular, if polyvinyl alcohol or a polyvinyl alcohol derivative is used as the binder, boric acid or a borate may be used as the crosslinking agent.

Boric acid may be orthoboric acid ($H_3BO_3$), metaboric acid, hypoboric acid, or the like. The borate may be a water-soluble salt of such a boric acid. Examples of the borate include alkali metal salts, such as sodium borate and potassium borate; alkaline-earth metal salts, such as magnesium borate and calcium borate; and ammonium salts. Of these, orthoboric acid may be used from the viewpoint of the stability of the coating liquid over time and the effect of reducing cracks.

The amount of the crosslinking agent to be used can be appropriately adjusted according to the production conditions and other factors. The content of the crosslinking agent in the first ink-receiving layer is preferably 1% by mass to 30% by mass, more preferably 5% by mass to 20% by mass, relative to the content of the first binder. If polyvinyl alcohol or a polyvinyl alcohol derivative is used as the first binder and at least one selected from the group consisting of boric acids and borates is used as the crosslinking agent, the total content of boric acids and borates in the first ink-receiving layer is preferably 0.01% by mass to 1% by mass, more preferably 0.05% by mass to 0.5% by mass, relative to the content of the polyvinyl alcohol or polyvinyl alcohol derivative.

Other Additives

The first ink-receiving layer may further contain other additives in addition to the constituents described above. Examples of such additives include a pH adjuster, a thickener, a fluidity improving agent, an antifoaming agent, a foam suppressor, a surfactant, a release agent, a penetrant, a coloring pigment, a coloring dye, a fluorescent brightening agent, an ultraviolet absorbent, an antioxidant, a preservative, a fungicide, a waterproofing agent, a dye fixing agent, a curing agent, and a weather-resistant material.

Second Ink-Receiving Layer (Upper Layer)

Inorganic Particles

The second ink-receiving layer contains inorganic particles (hereinafter also referred to as second inorganic particles). From the viewpoint of giving the second ink-receiving layer a negative surface zeta potential, anionic inorganic particles may be used as the second inorganic particles. Alternatively, if inorganic particles that are not anionic are used, an anionic surface treatment agent or the like may be used to control the surface charge of the inorganic particles to be negative. The use of anionic inorganic particles can reduce the likelihood that the water-soluble anionic resin in pigment ink clogs the pores of the second ink-receiving layer, thus reducing beading. The second inorganic particles have an average primary particle size of 50 nm or less. Using such particles reduces the pore size of the second ink-receiving layer and allows the pigment in the ink to be easily retained on the second ink-receiving layer, thus improving the color development of the pigment. The average primary particle size of the second inorganic particles is preferably 5 nm to 50 nm, more preferably 5 nm to 40 nm, particular preferably 5 nm to 30 nm.

As with the first inorganic particles, the second inorganic particles may be dispersed with a dispersant in a coating liquid that will be used to form the second ink-receiving layer. The average secondary particle size of the second inorganic particles in the dispersion may be in a range similar to that of the first inorganic particles.

The content of the second inorganic particles in the second ink-receiving layer may be 80% by mass or more relative to the total mass of the second ink-receiving layer. The content of the second inorganic particles in the second ink-receiving layer may be 80% by mass to 95% by mass relative to the total mass of the second ink-receiving layer.

The thickness of the second ink-receiving layer is 2 μm to 15 μm. The thickness of the second ink-receiving layer may be 4 μm to 15 μm.

The material of the second inorganic particles can be similar to the material of the first inorganic particles. More specifically, the material of the second inorganic particles is at least one selected from the group consisting of fumed silica, fumed alumina, and hydrated alumina. The use of these inorganic particles can increase ink absorbency. These inorganic particles may be used individually or in combination as needed. However, the second inorganic particles are different from the first inorganic particles in that the second inorganic particles are desirably anionic. For imparting anionic properties to the inorganic particles, the inorganic particles may be treated with a surface treatment agent or an alkaline compound, such as potassium hydroxide.

Binder

The second ink-receiving layer may contain a binder similar to the binder used in the first ink-receiving layer. The content of the second binder in the second ink-receiving layer is preferably 50% by mass or less, more preferably 30% by mass or less, relative to the content of the second inorganic particles. In view of the binding property of the second ink-receiving layer, the content of the binder in the second ink-receiving layer is preferably 5.0% by mass or more, more preferably 8.0% by mass or more, relative to the content of the second inorganic particles.

Crosslinking Agent

The second ink-receiving layer may contain a crosslinking agent similar to the crosslinking agent used in the first ink-receiving layer. The content of the crosslinking agent in the second ink-receiving layer is preferably 1% by mass to 30% by mass, more preferably 5% by mass to 20% by mass, relative to the content of the second binder. If polyvinyl alcohol or a polyvinyl alcohol derivative is used as the second binder and at least one material selected from the group consisting of boric acids and borates is used as the crosslinking agent, the total content of boric acids and borates in the second ink-receiving layer is preferably 0.01% by mass to 1% by mass, more preferably 0.05% by mass to 0.5% by mass, relative to the content of the polyvinyl alcohol or polyvinyl alcohol derivative.

Other Additives

The second ink-receiving layer may contain additives similar to the additives used in the first ink-receiving layer.

Undercoat Layer

An undercoat layer may be disposed between the substrate and the ink-receiving layers to increase the adhesion between the substrate and the ink-receiving layers. The undercoat layer may contain, for example, a water-soluble polyester resin, gelatin, or polyvinyl alcohol. The thickness of the undercoat layer may be 0.01 μm to 5 μm.

Back Coat Layer

A back coat layer may be disposed on the opposite surface of the substrate from the ink-receiving layers to improve the ease of handling and conveyance and to increase the resistance to the rubbing undergone when conveyed from a stack of recording media for continuous printing. The back coat layer may contain, for example, a white pigment and a binder. The back coat layer may be formed to such a thickness that the amount of the dried coating is 1 $g/m^2$ to 25 $g/m^2$.

Surface Zeta Potential

The term surface zeta potential used herein refers to the potential that occurs at the interface between a liquid and the surface of the solid first or second ink-receiving layer. In the present disclosure, the surface zeta potentials of the first and second ink-receiving layers are measured with a zeta potential analyzer (the product name ELS-Z2 (manufactured by Otsuka Electronics)) and a cell unit for plate-like sample measurement. A monitoring particle dispersion liquid containing light scattering monitoring particles is prepared by diluting polystyrene latex (produced by Otsuka Electronics) as monitoring particles 300 times with 10 mM NaCl solution. Then, the pH of the monitoring particle dispersion liquid is adjusted to the same pH as the ink-receiving layer. To reduce the pH, 0.1 M HCl solution is used. To increase the pH, 0.1 M NaOH solution is used. In the present disclosure, it is important that the surface zeta potential of the first ink-receiving layer measured as above be positive and that of the second ink-receiving layer be negative. The surface zeta potential of the first ink-receiving layer is preferably +3 mV or more, more preferably +5 mV or more. The upper limit of the surface zeta potential of the first ink-receiving layer may be, for example, but is not limited to, +10 mV. The surface zeta potential of the second ink-receiving layer is preferably −3 mV or less, more preferably −5 mV or less. The lower limit of the surface zeta potential of the second ink-receiving layer may be, for example, but is not limited to, −10 mV.

Production Process of Recording Medium

The recording medium may be produced in any process, but the production process may include preparing coating liquids for the ink-receiving layers, and applying the coating liquids to the substrate. The production process of the recording medium will now be described.

Method for Preparation of Substrate

The base sheet of the substrate may be prepared by a common paper making process. Paper-making machines include, for example, a Fourdrinier paper machine, a cylinder paper machine, a drum machine, and a twin wire machine. The base sheet may be surface-treated to increase the surface smoothness by applying heat and pressure during or after paper making. More specifically, the surface treatment may be performed by calendering, such as machine calendering or super calendering.

For forming a resin layer over the base sheet, that is, for coating the base sheet with a resin, a method such as melt extrusion, wet lamination, or dry lamination may be applied. In particular, the base sheet may be coated by melt extrusion, in which a molten resin is extruded onto either side or both sides of the base sheet. For example, a method called extrusion coating is widely used. In this method, a conveyed base sheet and a resin sheet extruded from an extrusion die are brought into contact with each other at a nip point between a nip roller and a cooling roller and pressed with the nip, thus laminating the resin layer and the base sheet. When the resin layer is formed by melt extrusion, the base sheet may be pretreated to increase the adhesion with the resin layer. The pretreatment may be, for example, acid etching treatment with a mixed solution of sulfuric acid and chromic acid, gas flame treatment, UV irradiation treatment, corona discharge treatment, glow discharge treatment, or anchor coating treatment with, for example, alkyl titanate. In particular, the pretreatment may be corona discharge treatment.

For forming a resin layer containing a white pigment, a mixture of a resin and the white pigment can be applied to coat the base sheet.

The production process of the recording medium may include winding the substrate prepared as above on a core into a roll before forming the ink-receiving layers. The core may have a diameter of 50 mm to 300 mm. The tension for winding may be 50 N/m to 800 N/m. The tension may be constant from the beginning to the end of winding. Alternatively, the tension may be gradually reduced from the beginning to the end of winding to relieve pressure concentration at the start point of winding.

Method for Formation of Ink-Receiving Layers

The ink-receiving layers may be formed over the substrate for the recording medium, for example, according to the following procedure. First, coating liquids for the ink-receiving layers are prepared. The coating liquids are individually applied to the substrate. Each coating liquid on the substrate is dried to yield an ink-receiving layer. For applying the coating liquids, for example, a curtain coater or a coater using an extrusion technique or a slide hopper technique may be used. The coating liquid may be heated for application. Examples of dryers used for drying the coating liquid after the application includes hot air dryers, infrared dryers, heating dryers, dryers using microwaves, and low-temperature dehumidifiers that are a type of dryer operable to blow low-temperature dehumidified dry air for drying. Examples of the hot air dryer include linear tunnel dryers, arch dryers, air loop dryers, and sine curve air float dryers.

Ink Jet Recording Method

In the ink jet recording method disclosed herein, ink is applied from an ink jet recording head onto the surface of the recording medium on the side having the first ink-receiving layer and the second ink-receiving layer. The ink to be applied onto the recording medium is either aqueous pigment ink or aqueous dye ink or both. Both pigment ink and dye ink may be applied from an ink jet recording head to record images on the recording medium.

For ejecting ink, mechanical energy or thermal energy may be applied to the ink. In particular, thermal energy may be applied to the ink to eject the ink.

Ink

Known inks may be used for the ink jet recording method. In particular, aqueous ink may be used. The aqueous ink contains an aqueous medium that is a mixture of water and a water-soluble organic solvent.

The water may be ion-exchanged water or pure water. The water content (mass %) of the ink may be 50.0% to 95.0% relative to the total mass of the ink.

The content of the water-soluble organic solvent (% by mass) of the ink may be 3.0% by mass to 50.0% by mass relative to the total mass of the ink. Any water-soluble organic solvent commonly used in ink jet inks in the related art may be used. Examples of the water-soluble organic solvent include alkyl alcohols with 1 to 4 carbon atoms, amides, ketones, keto-alcohols, ethers, polyalkylene glycols, glycols, alkylene glycols containing alkylene groups with 2 to 6 carbon atoms, polyhydric alcohols, alkyl ether acetates, polyhydric alcohol alkyl ethers, nitrogen-containing compounds, and sulfur-containing compounds. Such water-soluble organic solvents may be used individually or in combination as needed. The water may be ion-exchanged water. The content of the water (% by mass) in the ink may be 50.0% by mass to 95.0% by mass relative to the total mass of the ink.

The coloring material in the ink may be selected from known pigments and dyes. Pigments are superior in resistance to image discoloration.

Examples of pigments include azo pigments, quinacridone pigments, anthraquinone pigments, diketopyrrolopyrrole pigments, quinophthalone pigments, methine pigments, azomethine pigments, phthalocyanine pigments, perylene pigments, perinone pigments, and isoindolinone pigments.

The ink may further contain a water-soluble anionic resin.

Examples of the water-soluble anionic resin include acrylic resin, polyurethane resin, polyester resin, and their derivatives and copolymers. Anionic functional groups include carbonyl, sulfo, and phosphonate groups.

Other Ink Constituents

In addition to the constituents described above, the ink may further contain a moisture-retentive compound that is solid at room temperature, such as urea, a urea derivative, trimethylolpropane, or trimethylolethane. The content (% by mass) of such a compound in the ink is preferably 0.1% by mass to 20.0% by mass, more preferably 3.0% by mass to 10.0% by mass, relative to the total mass of the ink.

In addition to the constituents described above, the ink may further contain various optional additives, such as a surfactant, a pH adjuster, a rust preventive, a corrosion inhibitor, a preservative, an antifungal agent, an antioxidant, and an antireductant.

The present disclosure provides a highly glossy recording medium that can reduce beading in image recording at a high speed using pigment ink and can produce highly color-developed images in image recording using dye ink. The present disclosure also provides an ink jet recording method that can produce high-quality images.

EXAMPLES

The present disclosure will be further described in detail with reference to Examples and Comparative Examples. The implementation of the present disclosure is not limited to the following Examples unless departing from the spirit of the present disclosure. In the following Examples, "part(s)" is on a mass basis unless otherwise specified.

Production of Recording Media

Preparation of Substrate

A paper stock was prepared by mixing 80 parts of LBKP having a Canadian standard freeness (CFS) of 450 mL, 20 parts of NBKP having a CFS of 480 mL, 0.60 part of cationized starch, 10 parts of ground calcium carbonate, 15 parts of precipitated calcium carbonate, 0.10 part of alkyl ketene dimer, and 0.030 part of cationic polyacrylamide, and adding water to the mixture to adjust the solid content to 3.0% by mass. The paper stock was subjected to paper making with a Fourdrinier machine, followed by three-step wet pressing, and drying with a multicylinder dryer. Then, the resulting sheet was soaked with an aqueous solution of oxidized starch and dried with a size press machine to a solid content of 1.0 g/m$^2$. The sheet was then finished by machine calendering to yield a 100 μm thick base sheet having a basis weight of 170 g/m$^2$, a Stockigt sizing degree of 100 s, an air permeance of 50 s, a Bekk smoothness of 30 s, and a Gurley stiffness of 11.0 mN. Subsequently, a resin composition containing 70 parts of a low-density polyethylene, 20 parts of a high-density polyethylene, and 10 parts of titanium oxide was applied onto one side of the base sheet in such an amount that the dried coating would be 25 g/m$^2$. This side of the base sheet coated with the resin composition was used as the front side of the substrate. Then, a low-density polyethylene was applied onto the other side of the base sheet to complete a substrate.

Production of Recording Medium 1

Coating liquid 1-1, described later herein, for a first ink-receiving layer was applied to the substrate prepared above and dried with 80° C. hot air to form a 30 μm thick first ink-receiving layer. Furthermore, coating liquid 2-1, described later herein, for a second ink-receiving layer was applied onto the first ink-receiving layer and dried with 80° C. hot air to form a 5 μm thick second ink-receiving layer. Thus, recording medium 1 including ink-receiving layers with a total thickness of 35 μm was produced.

Preparation of Coating Liquid for First Ink-Receiving Layer

Fumed Silica Dispersion Liquid 1

Fumed silica (the product name AEROSIL 300 (produced by EVONIK) with an average primary particle size of 7 nm) was added into ion-exchanged water to give a solid content of 20% by mass. Then, 5.0 parts of diallyldimethylammonium chloride polymer was added relative to 100 parts of the fumed silica solids in the ion-exchanged water, followed by stirring, and ion-exchanged water was further added to give a fumed silica solid content of 15% by mass, yielding fumed silica dispersion liquid 1.

Coating Liquid 1-1 for First Ink-Receiving Layer

Coating liquid 1-1 was prepared for a first ink-receiving layer by mixing the above-prepared fumed silica dispersion liquid 1, a polyvinyl alcohol aqueous solution (prepared by adjusting the solid content of the product name PVA 235 (produced by Kuraray) to 8% by mass), and a boric acid aqueous solution (boric acid solid content: 3% by mass) in a solid mass ratio (fumed silica:polyvinyl alcohol:boric acid) of 100:23:5.

Preparation of Coating Liquid for Second Ink-Receiving Layer

Fumed Silica Dispersion Liquid 2

Fumed silica (AEROSIL 300 (produced by EVONIK) with an average primary particle size of 7 nm) was added to ion-exchanged water to give a solid content of 20% by mass. Then, 5.0 parts of potassium hydroxide was added relative to 100 parts of the fumed silica solids in the ion-exchanged water, followed by stirring, and ion-exchanged water was further added in an amount to give a fumed silica solid content of 15% by mass, yielding fumed silica dispersion liquid 2.

Coating Liquid 2-1 for Second Ink-Receiving Layer

Coating liquid 2-1 was prepared for a second ink-receiving layer by mixing the above-prepared fumed silica dispersion liquid 2 and a polyvinyl alcohol aqueous solution (prepared by adjusting the solid content of the product name PVA 235 (produced by Kuraray) to 8% by mass) in a solid mass ratio (fumed silica:polyvinyl alcohol) of 100:23.

Production of Recording Media 2 to 9

Recording media 2 to 9 were produced in the same manner as recording medium 1 except that the thicknesses of the first and second ink-receiving layers were varied as presented in Tables 1 and 2.

Production of Recording Medium 10

Recording medium 10 was produced in the same manner as recording medium 1 except that the coating liquid for the second ink-receiving layer was replaced with the following coating liquid 2-2.

Preparation of Coating Liquid for Second Ink-Receiving Layer

Fumed Alumina Dispersion Liquid 1

Into ion-exchanged water, 100 parts of fumed alumina (the product name AEROXIDE Alu C (produced by EVONIK)) and 10 parts of sodium polyacrylate were added to a solid content of 20% by mass. The resulting mixture was agitated in a mixer for 30 minutes to yield fumed alumina dispersion liquid 1.

Coating Liquid 2-2 for Second Ink-Receiving Layer

Coating liquid 2-2 was prepared for a second ink-receiving layer by mixing the above-prepared fumed alumina dispersion liquid 1 and a polyvinyl alcohol aqueous solution (prepared by adjusting the solid content of the product name PVA 235 (produced by Kuraray) to 8% by mass) in a solid mass ratio (fumed alumina:polyvinyl alcohol) of 100:10.

Production of Recording Media 11 and 12

Recording media 11 and 12 were produced in the same manner as recording medium 1, except that the coating liquid for the second ink-receiving layer was replaced with the following coating liquid 2-3 and the thickness of the second ink-receiving layer was varied as presented in Table 2.

Preparation of Coating Liquid for Second Ink-Receiving Layer

Hydrated Alumina Dispersion Liquid 1

Hydrated alumina (the product name DISPERAL HP14 (produced by Sasol), average primary particle size: 14 nm) was added into ion-exchanged water to adjust the solid content to 20% by mass. Then, 5.0 parts of potassium hydroxide was added relative to 100 parts of the hydrated alumina solids in the water, followed by stirring, and ion-exchanged water was further added in an amount to give a hydrated alumina solid content of 15% by mass to yield hydrated alumina dispersion liquid 1.

Coating Liquid 2-3 for Second Ink-Receiving Layer

Coating liquid 2-3 was prepared for a second ink-receiving layer by mixing the above-prepared hydrated alumina dispersion liquid 1 and a polyvinyl alcohol aqueous solution (prepared by adjusting the solid content of the product name PVA 235 (produced by Kuraray) to 8% by mass) in a solid mass ratio (hydrated alumina:polyvinyl alcohol) of 100:10.

Production of Recording Medium 13

Recording medium 13 was produced in the same manner as recording medium 1 except that the coating liquid for the first ink-receiving layer was replaced with the following coating liquid 1-2.

Preparation of Coating Liquid for First Ink-Receiving Layer

Hydrated Alumina Dispersion Liquid 2

Hydrated alumina (the product name DISPERAL HP14 (produced by Sasol), average primary particle size: 14 nm) was added into ion-exchanged water to adjust the solid content to 25% by mass. Then, 1.4 parts of methanesulfonic acid was added relative to 100 parts of the hydrated alumina solids in the ion-exchanged water, followed by stirring, and ion-exchanged water was further added in an amount to give a hydrated alumina solid content of 21% by mass, yielding hydrated alumina dispersion liquid 2.

Coating Liquid 1-2 for First Ink-Receiving Layer

Coating liquid 1-2 for a first ink-receiving layer was prepared by mixing the above-prepared hydrated alumina dispersion liquid 2 and a polyvinyl alcohol aqueous solution (prepared by adjusting the solid content of the product name PVA 235 (produced by Kuraray) to 8% by mass) in a solid mass ratio (hydrated alumina:polyvinyl alcohol) of 100:10.

Production of Recording Media 14 and 15

Recording media 14 and 15 were produced in the same manner as recording medium 1, except that the coating liquid for the second ink-receiving layer was replaced with the following coating liquid 2-4 and the thickness of the second ink-receiving layer was varied as presented in Table 2.

Preparation of Coating Liquid for Second Ink-Receiving Layer
Colloidal Silica Dispersion Liquid 1
Colloidal silica (the product name SNOWTEX ST-O (produced by Nissan Chemical Industries), average primary particle size: 12 nm) was added into ion-exchanged water in an amount to give a solid content of 15% by mass, yielding colloidal silica dispersion liquid 1.
Coating Liquid 2-4 for Second Ink-Receiving Layer
Coating liquid 2-4 was prepared for a second ink-receiving layer by mixing the above-prepared colloidal silica dispersion liquid 1 and a polyvinyl alcohol aqueous solution (prepared by adjusting the solid content of the product name PVA 235 (produced by Kuraray) to 8% by mass) in a solid mass ratio (colloidal silica:polyvinyl alcohol) of 100:10.
Production of Recording Medium 16
Recording medium 16 was produced in the same manner as recording medium 1, except that the coating liquid for the second ink-receiving layer was replaced with the following coating liquid 2-5.
Preparation of Coating Liquid for Second Ink-Receiving Layer
Wet Process Silica Dispersion Liquid 2
Wet process silica (the product name P403 (produced by Grace)) was added into ion-exchanged water in an amount to give a solid content of 20% by mass, followed by agitation in a mixer for 30 minutes to yield wet silica dispersion liquid 2.
Coating Liquid 2-5 for Second Ink-Receiving Layer
Coating liquid 2-5 was prepared for a second ink-receiving layer by mixing the above-prepared wet process silica dispersion liquid 2 and a polyvinyl alcohol aqueous solution (prepared by adjusting the solid content of the product name PVA 235 (produced by Kuraray) to 8% by mass) in a solid mass ratio (wet process silica:polyvinyl alcohol) of 100:30.

Production of Recording Medium 17
Recording medium 16 was produced in the same manner as recording medium 1, except that the coating liquid for the second ink-receiving layer was replaced with coating liquid 1-1.
Production of Recording Medium 18
Recording medium 18 was produced in the same manner as recording medium 1, except that the coating liquid for the first ink-receiving layer was replaced with coating liquid 2-1.
Production of Recording Medium 19
Recording medium 19 was produced in the same manner as recording medium 1, except that the coating liquid for the first ink-receiving layer was replaced with the following coating liquid 1-3.
Preparation of Coating Liquid for First Ink-Receiving Layer
Wet Process Silica Dispersion Liquid 1
Wet process silica (the product name SYLOID C803 (produced by Grace)) was added into ion-exchanged water in an amount to give a solid content of 20% by mass. Then, 5 parts of polyaluminum chloride (Takibine #1500, produced by Taki Chemical) was added relative to 100 parts of the wet process silica solids in the ion-exchanged water, followed by agitation in a mixer for 30 minutes to yield wet process silica dispersion liquid 1.
Coating Liquid 1-3 for First Ink-Receiving Layer
Coating liquid 1-3 was prepared for a first ink-receiving layer by mixing the above-prepared wet process silica dispersion liquid 1 and a polyvinyl alcohol aqueous solution (prepared by adjusting the solid content of the product name PVA 235 (produced by Kuraray) to 8% by mass) in a solid mass ratio (wet process silica:polyvinyl alcohol) of 100:30.
Production of Recording Medium 20
Recording medium 20 was produced in the same manner as recording medium 1, except that the thickness of the second ink-receiving layer was varied as presented in Table 2.

TABLE 1

| | | First ink-receiving layer (lower layer) | | | | |
| --- | --- | --- | --- | --- | --- | --- |
| | | First inorganic particle dispersion liquid | Coating liquid for first ink-receiving layer | Thickness (μm) | Surface zeta potential (mV) | Average primary particle size (nm) |
| Example 1 | Recording medium 1 | Fumed silica dispersion liquid 1 | 1-1 | 30 | +5 | 7 |
| Example 2 | Recording medium 2 | Fumed silica dispersion liquid 1 | 1-1 | 30 | +5 | 7 |
| Example 3 | Recording medium 3 | Fumed silica dispersion liquid 1 | 1-1 | 30 | +5 | 7 |
| Example 4 | Recording medium 4 | Fumed silica dispersion liquid 1 | 1-1 | 30 | +5 | 7 |
| Example 5 | Recording medium 5 | Fumed silica dispersion liquid 1 | 1-1 | 30 | +5 | 7 |
| Example 6 | Recording medium 6 | Fumed silica dispersion liquid 1 | 1-1 | 30 | +5 | 7 |
| Example 7 | Recording medium 7 | Fumed silica dispersion liquid 1 | 1-1 | 20 | +5 | 7 |
| Example 8 | Recording medium 8 | Fumed silica dispersion liquid 1 | 1-1 | 25 | +5 | 7 |
| Example 9 | Recording medium 9 | Fumed silica dispersion liquid 1 | 1-1 | 15 | +5 | 7 |
| Example 10 | Recording medium 10 | Fumed silica dispersion liquid 1 | 1-1 | 30 | +5 | 7 |
| Example 11 | Recording medium 11 | Fumed silica dispersion liquid 1 | 1-1 | 30 | +5 | 7 |
| Example 12 | Recording medium 12 | Fumed silica dispersion liquid 1 | 1-1 | 30 | +5 | 7 |
| Example 13 | Recording medium 13 | Hydrated alumina dispersion liquid 2 | 1-2 | 30 | +6 | 14 |

TABLE 1-continued

| | | First ink-receiving layer (lower layer) | | | | |
|---|---|---|---|---|---|---|
| | | First inorganic particle dispersion liquid | Coating liquid for first ink-receiving layer | Thickness (μm) | Surface zeta potential (mV) | Average primary particle size (nm) |
| Comparative Example 1 | Recording medium 14 | Fumed silica dispersion liquid 1 | 1-1 | 30 | +5 | 7 |
| Comparative Example 2 | Recording medium 15 | Fumed silica dispersion liquid 1 | 1-1 | 30 | +5 | 7 |
| Comparative Example 3 | Recording medium 16 | Fumed silica dispersion liquid 1 | 1-1 | 30 | +5 | 7 |
| Comparative Example 4 | Recording medium 17 | Fumed silica dispersion liquid 1 | 1-1 | 30 | +5 | 7 |
| Comparative Example 5 | Recording medium 18 | Fumed silica dispersion liquid 2 | 2-1 | 30 | −5 | 7 |
| Comparative Example 6 | Recording medium 19 | Wet process silica dispersion liquid 1 | 1-3 | 30 | +3 | 3000 |
| Comparative Example 7 | Recording medium 20 | Fumed silica dispersion liquid 1 | 1-1 | 30 | +5 | 7 |

TABLE 2

| | | Second ink-receiving layer (upper layer) | | | | | All Ink-receiving layers Total thickness (μm) |
|---|---|---|---|---|---|---|---|
| | | Second inorganic particle dispersion liquid | Coating liquid for second ink-receiving layer | Thickness (μm) | Surface zeta potential (mV) | Average primary particle size (nm) | |
| Example 1 | Recording medium 1 | Fumed silica dispersion liquid 2 | 2-1 | 5 | −5 | 7 | 35 |
| Example 2 | Recording medium 2 | Fumed silica dispersion liquid 2 | 2-1 | 4 | −5 | 7 | 34 |
| Example 3 | Recording medium 3 | Fumed silica dispersion liquid 2 | 2-1 | 3 | −5 | 7 | 33 |
| Example 4 | Recording medium 4 | Fumed silica dispersion liquid 2 | 2-1 | 10 | −5 | 7 | 40 |
| Example 5 | Recording medium 5 | Fumed silica dispersion liquid 2 | 2-1 | 15 | −5 | 7 | 45 |
| Example 6 | Recording medium 6 | Fumed silica dispersion liquid 2 | 2-1 | 17 | −5 | 7 | 47 |
| Example 7 | Recording medium 7 | Fumed silica dispersion liquid 2 | 2-1 | 5 | −5 | 7 | 25 |
| Example 8 | Recording medium 8 | Fumed silica dispersion liquid 2 | 2-1 | 5 | −5 | 7 | 30 |
| Example 9 | Recording medium 9 | Fumed silica dispersion liquid 2 | 2-1 | 5 | −5 | 7 | 20 |
| Example 10 | Recording medium 10 | Fumed alumina dispersion liquid 1 | 2-2 | 5 | −3 | 12 | 35 |
| Example 11 | Recording medium 11 | Hydrated alumina dispersion liquid 1 | 2-3 | 5 | −3 | 14 | 35 |
| Example 12 | Recording medium 12 | Hydrated alumina dispersion liquid 1 | 2-3 | 3 | −3 | 14 | 33 |
| Example 13 | Recording medium 13 | Fumed silica dispersion liquid 2 | 2-1 | 5 | −5 | 7 | 35 |
| Comparative Example 1 | Recording medium 14 | Colloidal silica dispersion liquid 1 | 2-4 | 1 | −4 | 12 | 31 |
| Comparative Example 2 | Recording medium 15 | Colloidal silica dispersion liquid 1 | 2-4 | 5 | −4 | 12 | 35 |
| Comparative Example 3 | Recording medium 16 | Wet process silica dispersion liquid 2 | 2-5 | 5 | −3 | 3000 | 35 |
| Comparative Example 4 | Recording medium 17 | Fumed silica dispersion liquid 1 | 1-1 | 5 | +5 | 7 | 35 |
| Comparative Example 5 | Recording medium 18 | Fumed silica dispersion liquid 2 | 2-1 | 5 | −5 | 7 | 35 |
| Comparative Example 6 | Recording medium 19 | Fumed silica dispersion liquid 2 | 2-1- | 5 | −5 | 7 | 35 |
| Comparative Example 7 | Recording medium 20 | Fumed silica dispersion liquid 2 | 2-1- | 1 | −5 | 7 | 31 |

Examples 1 to 13 and Comparative Examples 1 to 7

The resulting recording media 1 to 20 were evaluated by the following methods.

Evaluation

Evaluation of Beading

Recording media 1 to 20 produced above were subjected to high-speed recording with pigment ink to evaluate the degree of beading. The product name Pro-10 (manufactured by CANON KABUSHIKI KAISHA) whose recording method was modified was used as the ink jet recording apparatus. After the modification, the carriage speed was 12.5 in/s, and the number of passes for printing was variable. In this recording apparatus, a duty of 100% means that 22 ng of ink is applied to a 600 dpi square.

First, a green solid image was recorded on each of recording media 1 to 20 with the ink jet recording apparatus at a recording duty of 200% while the total number of scans was varied. The amount of ink applied for each scan was equivalent to the quotient of the amount for 200% duty divided by the total number of scans. The smaller the total number of scans, the larger the amount of ink applied per unit time and, hence, the higher the printing speed (the faster the image recording). The recorded images were visually checked for beading. Beading is a phenomenon in which ink droplets merge before being absorbed by the recording medium and is known to be highly correlated with ink absorbency. Recording media that did not cause beading even in images recorded at a high duty can be evaluated as high ink absorbency media. The rating criteria are as follows.

4: No beading occurred in 200% duty images recorded by two scans in total.
3: Beading was recognized in 200% duty images recorded by two scans in total but not in 200% duty images recorded by three scans in total.
2: Beading was recognized in 200% duty images recorded by three scans in total but not in 200% duty images recorded by four scans in total.
1: Beading was recognized in 200% duty images recorded by four scans in total.

Evaluation of Color Development of Dye Inks

A black solid image was recorded on the recording surface of each of recording media 1 to 20 produced above with an ink jet recording apparatus (the trade name XK70, manufactured by CANON KABUSHIKI KAISHA) in a photo paper, glossy gold, no color correction mode. The recording surface refers to the surface of the recording media on the side having the first and second ink-receiving layers. The optical density of the recorded images was measured with an optical reflection densitometer (the trade name 530 Spectrodensitometer, manufactured by X-Rite). The color development of each image was rated using the measured optical density. The rating criteria are as follows. The rating results are presented in Table 2.

4: Optical density was 1.80 or more.
3: Optical density was 1.70 to less than 1.80.
2: Optical density was 1.60 to less than 1.70.
1: Optical density was less than 1.60.

Evaluation of Gloss

The gloss of recording media 1 to 20 at the surface on the side having the first and second ink-receiving layers was measured at a tilt angle of 20° with a gloss meter (VG2000 (manufactured by Nippon Denshoku Industries)).

3: 20° gloss was 7% or more.
2: 20° gloss was 3% to less than 7%.
1: 20° gloss was less than 3%.

TABLE 3

| | | Evaluation | | |
| --- | --- | --- | --- | --- |
| | | Beading | Dye color development | Gloss |
| Example 1 | Recording medium 1 | 4 | 4 | 3 |
| Example 2 | Recording medium 2 | 3 | 4 | 3 |
| Example 3 | Recording medium 3 | 2 | 4 | 3 |
| Example 4 | Recording medium 4 | 4 | 4 | 3 |
| Example 5 | Recording medium 5 | 4 | 3 | 3 |
| Example 6 | Recording medium 6 | 4 | 2 | 3 |
| Example 7 | Recording medium 7 | 3 | 4 | 3 |
| Example 8 | Recording medium 8 | 4 | 4 | 3 |
| Example 9 | Recording medium 9 | 2 | 4 | 3 |
| Example 10 | Recording medium 10 | 4 | 4 | 3 |
| Example 11 | Recording medium 11 | 4 | 4 | 3 |
| Example 12 | Recording medium 12 | 2 | 4 | 3 |
| Example 13 | Recording medium 13 | 4 | 4 | 3 |
| Comparative Example 1 | Recording medium 14 | 1 | 4 | 2 |
| Comparative Example 2 | Recording medium 15 | 1 | 3 | 3 |
| Comparative Example 3 | Recording medium 16 | 4 | 1 | 1 |
| Comparative Example 4 | Recording medium 17 | 1 | 4 | 3 |
| Comparative Example 5 | Recording medium 18 | 4 | 1 | 3 |
| Comparative Example 6 | Recording medium 19 | 2 | 1 | 1 |
| Comparative Example 7 | Recording medium 20 | 1 | 4 | 3 |

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-079108, filed May 7, 2021 and Japanese Patent Application No. 2022-063422, filed Apr. 6, 2022, both of which are hereby incorporated by reference herein in their entirety.

What is claimed is:
1. A recording medium comprising:
a substrate;
a first ink-receiving layer; and
a second ink-receiving layer adjacent to the first ink-receiving layer, in this order, wherein
the first ink-receiving layer contains first inorganic particles having an average primary particle size of 50 nm or less,
the first inorganic particles are particles of at least one material selected from the group consisting of fumed silica, fumed alumina, and hydrated alumina, and
the first ink-receiving layer has a positive surface zeta potential, and
wherein
the second ink-receiving layer contains second inorganic particles having an average primary particle size of 50 nm or less,
the second inorganic particles are particles of at least one material selected from the group consisting of fumed silica, fumed alumina, and hydrated alumina,
the second ink-receiving layer has a negative surface zeta potential, and
the second ink-receiving layer has a thickness of 2 µm to 15 µm.

2. The recording medium according to claim 1, wherein the content of the first inorganic particles in the first ink-receiving layer is 80% by mass or more relative to a total mass of the first ink-receiving layer.

3. The recording medium according to claim 1, wherein the content of the second inorganic particles in the second ink-receiving layer is 80% by mass or more relative to a total mass of the second ink-receiving layer.

4. The recording medium according to claim 1, wherein a thickness of the second ink-receiving layer is 4 µm to 15 µm.

5. The recording medium according to claim 1, wherein a total thickness of the first ink-receiving layer and the second ink-receiving layer is 25 µm or more.

6. The recording medium according to claim 1, wherein the second inorganic particles contain fumed silica.

7. The recording medium according to claim 1, wherein the content of colloidal silica in the second ink-receiving layer is 0% by mass to 50% by mass relative to a total mass of the second ink-receiving layer.

8. An ink jet recording method comprising:
recording an image on a recording medium by applying at least one of pigment ink containing pigment and dye ink containing dye from an ink jet recording head onto a surface of the recording medium on a side having a first ink-receiving layer and a second ink-receiving layer,
wherein the recording medium comprises:
a substrate;
the first ink-receiving layer; and
the second ink-receiving layer adjacent to the first ink-receiving layer, in this order,
wherein
the first ink-receiving layer contains first inorganic particles having an average primary particle size of 50 nm or less,
the first inorganic particles are particles of at least one material selected from the group consisting of fumed silica, fumed alumina, and hydrated alumina, and
the first ink-receiving layer has a positive surface zeta potential, and
wherein
the second ink-receiving layer contains second inorganic particles having an average primary particle size of 50 nm or less,
the second inorganic particles are particles of at least one material selected from the group consisting of fumed silica, fumed alumina, and hydrated alumina,
the second ink-receiving layer has a negative surface zeta potential, and
the second ink-receiving layer has a thickness of 2 µm to 15 µm.

9. The ink jet recording method according to claim 8, wherein the pigment ink further contains a water-soluble anionic resin.

10. The ink jet recording method according to claim 8, wherein the image is recorded on the recording medium by applying both the pigment ink and the dye ink from the ink jet recording head onto the surface of the recording medium on the side having the first ink-receiving layer and the second ink-receiving layer.

* * * * *